Feb. 25, 1958     C. T. McCOY     2,825,009
ELECTRICAL SYSTEM Filed April 19, 1952                                                                    4 Sheets-Sheet 1

INVENTOR
CLAUDIUS T. MC COY
BY Brown, Denk & Lynnestvedt
AGENTS

Feb. 25, 1958

C. T. McCOY 2,825,009

ELECTRICAL SYSTEM

Filed April 19, 1952

INVENTOR
CLAUDIUS T. McCOY
BY
Brown, Jenks & Lynnestvedt
AGENTS

INVENTOR
CLAUDIUS T. McCOY
BY
Brown, Jenks & Synnestvedt
AGENTS

United States Patent Office 2,825,009
Patented Feb. 25, 1958

2,825,009

ELECTRICAL SYSTEM

Claudius T. McCoy, Narberth, Pa., assignor to Philco Corporation, Philadelphia, Pa., a corporation of Pennsylvania Application April 19, 1952, Serial No. 283,216

18 Claims. (Cl. 317—101)

This invention relates to an improvement in electrical amplifiers and, more particularly, to an improved mechanical construction of such amplifiers.

Amplifiers operating in the range above 10 mc. are in general use as intermediate frequency amplifiers in radar systems, in radio relay systems and in radio and television receivers. Similar amplifiers are also employed in control systems for guided missiles and in aircraft radar and radio communication systems. Intermediate frequency amplifiers may also be used in test equipment for the above-named systems, for example, in circuits for measuring the noise figure of a mixer in a radar system.

The stability of the intermediate frequency amplifier is generally an important factor in determining the overall performance characteristics of each of the above systems. Extreme stability of the intermediate frequency amplifiers is essential in test equipment if useful data are to be obtained. By amplifier stability is meant the absence of changes in the electrical characteristics of the amplifier caused by mechanical shocks or by changes in mechanical position or electrical condition of operation of equipment in the vicinity of the intermediate frequency amplifier. Instability in an intermediate frequency amplifier is sometimes somewhat loosely termed "regeneration." However, the effect can be somewhat more accurately described in mathematical terms as shifting of the poles (denominator roots) in the amplifier overall voltage gain function.

Amplifiers used in aircraft and guided missiles must withstand shock forces that are many times the force of gravity. These amplifiers must not only withstand these shock forces in the sense that no components are damaged thereby but the relative physical location of parts within the amplifier must also be maintained so that the electrical characteristics of the amplifier are not changed as a result of such shocks. Amplifiers in test equipment and in portable radio, radar and television equipment are also subjected to severe mechanical shocks in normal use.

As the complexity of electronic systems increases it becomes increasingly necessary that the various component parts of such systems be made interchangeable, preferably as "plug in" units, so that failure of one component will not result in a system being rendered inoperative over an extended period of time. The interchangeable units should be sufficiently alike in all characteristics so that the overall efficiency of operation of the system is not materially altered by the replacement of one or more components.

Finally, as the number of systems employing amplifiers and related circuits increases and the number of such circuits within each system increases, it becomes highly desirable from an economic standpoint to employ a type of construction that will yield the above essential characteristics and yet be capable of mass production by the use of assembly line technique or better still, through the use of completely automatic machinery.

The above characteristics have been difficult to achieve with previous types of amplifier construction. Amplifiers constructed according to previously approved designs were particularly susceptible to mechanical shocks for the reason that many of the circuit elements, for example resistors and capacitors, were mounted at some distance from the chassis on stand-off insulators. In this position, they received very little mechanical support from the chassis. This position of the resistors and capacitors in the amplifier also contributed to electrical instability in the amplifier since it was difficult to shield these elements against electrostatic or electromagnetic coupling from adjacent circuits or from adjacent parts of the same circuit. Instability may also result by grid currents being carried to adjacent chassis by contact. This method of mounting circuit elements had the third disadvantage of making it difficult to manufacture amplifiers with reproducible characteristics. A minor shift in the position of one of these circuit elements relative to the chassis or relative to an adjacent circuit element might cause a relatively large change in the overall characteristics of the amplifier. This dependence of the characteristics of the amplifier on minor changes in physical location of circuit elements is due, to a great extent, to the possibility of large electrostatic or magnetic coupling to the circuit element. Also, the method of mounting circuit elements previously employed generally required the use of relatively long leads to connect the various circuit elements together and to connect the circuit elements to the vacuum tubes forming a part of the circuit. Changes in position of these leads would also change the characteristics of the amplifier to such an extent that the amplifiers could generally not be used as interchangeable units without careful selection of matched amplifiers from the general run of production or by careful adjustment of the amplifiers by highly skilled personnel after the amplifiers were completely assembled.

Therefore, it is an object of the present invention to provide an improved mechanical construction for amplifiers operating above a frequency of approximately 10 mc.

A more detailed object of the invention is to provide a mechanical construction for amplifiers that greatly improves the electrical stability thereof.

Another object of the invention is to provide a mechanical construction for amplifiers that increases the resistance of such amplifier to shock forces.

A further object of the invention is to provide a mechanical construction that will reduce variations in the electrical characteristics between amplifiers of the same type.

It is a further object of the present invention to provide a form of mechanical construction for amplifiers that is suitable for mass production on automatic machines or by semi-skilled labor.

Another object of the present invention is to provide a method of mounting circuit elements that will reduce the electromagnetic and electrostatic coupling to these circuit elements.

These and other objects of the present invention which will become apparent as the description of the invention proceeds are generally accomplished by providing a chassis construction which includes a metallic wiring plate disposed in a plane including the axes of the electron tubes forming a part of the circuit. The electron tubes in this novel construction are preferably arranged with the base adjacent to one edge of the wiring plate. All circuit elements of the type including resistors, capacitors and inductors are mounted in close proximity to the wiring plate. All connecting points that are at a high signal level are also located adjacent to the wiring plate. The novel construction of the present invention also affords magnetic shielding of interstage coupling coils and the elimination of coupling between adjacent parts of the circuit due to common ground currents in the chassis. In general, the invention is not concerned with the particular electrical characteristics of the circuits involved except insofar as the electrical characteristics are affected by the mechanical construction.

For a better understanding of the invention, reference should now be made to the following detailed description and the accompanying drawings, in which.

Figures 1, 2:
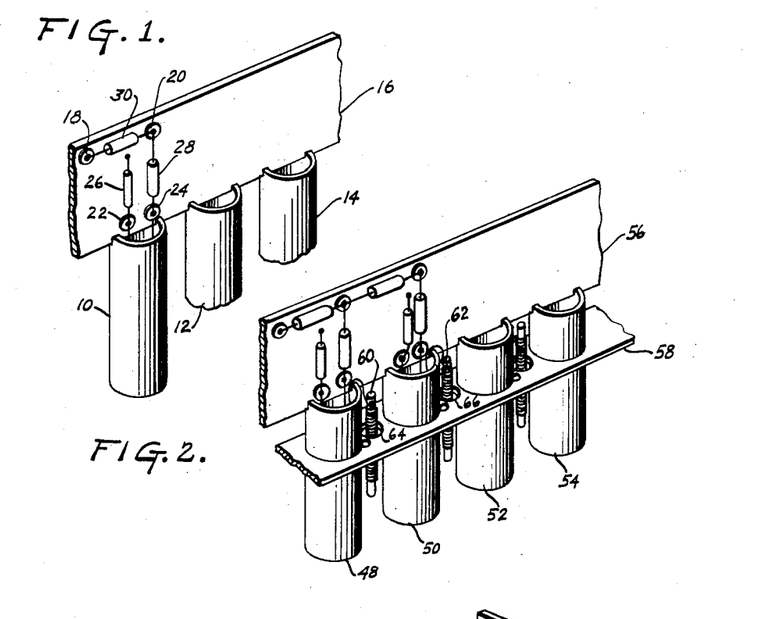
Fig. 1 illustrates one basic embodiment of the present invention.
Fig. 2 illustrates an embodiment similar to Fig. 1 but with the addition of means for electromagnetically shielding interstage coupling coils.

In the embodiment of the invention shown in Fig. 1, three metallic, tubular members 10, 12 and 14 are provided for supporting and shielding the electron tubes of a circuit constructed on the chassis shown. The longitudinal axes of tubular members 10, 12 and 14 are arranged in a common plane. A metallic wiring plate 16 is also disposed in this plane and is mechanically joined to each of the tubular members at two diametrically opposed points. Therefore, one edge of plate 16 lies along a diameter of each of the tubular shielding members 10, 12 and 14 and an opening is provided on each side of plate 16 through which the electrode leads from a tube located within the shielding member may extend. A plurality of dielectric wafers 18, 20, 22 and 24 are mounted on wiring plate 16 with one face of each wafer in contact with plate 16. The dielectric wafers are provided with metallic surfaces on the two faces so that they may be mounted on plate 16 by soldering and so that leads from circuit elements may be soldered to the exposed faces. The electrode leads from an electron tube located within tubular member 10 are shown as being joined to the upper faces of wafers 22 and 24 respectively. Circuit elements 26, 28 and 30 are shown as having one or more leads secured to the upper faces of the various dielectric wafers. For example, circuit element 28, which may be a one-half watt carbon resistor or a tubular ceramic capacitor, has one end lead secured to the upper face of wafer 20 and a second end lead connected to the upper face of wafer 24. The connection of the end leads of circuit element 28 to wafers 20 and 24 provides a means for mechanically supporting element 28 adjacent to the wiring plate 16. Circuit element 26 is supported by securing one end lead of this circuit element to the upper face of wafer 22 and by securing the second end lead directly to the wiring plate 16. The common connection of an end lead from circuit element 28 and an electrode lead from an electron tube within member 10 on the upper face of wafer 24 provides means for electrically interconnecting the electrode lead and circuit element 28. The interconnection of circuit element 28 and circuit element 30 is made by the common connection of end leads from these two circuit elements on the upper face of wafer 20.

Figure 1A:
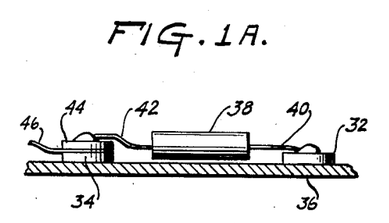
Fig. 1A is an auxiliary view showing in detail the manner in which circuit elements are mounted on the wiring plate.

The manner in which circuit elements are mounted on the wiring plate is illustrated in greater detail in Fig. 1A. In Fig. 1A dielectric wafers 32 and 34 have one face soldered or otherwise electrically and mechanically joined to conductive wiring plate 36. A circuit element 38 has one end lead 40 soldered to the upper face of wafer 32. The second end lead 42 of circuit element 38 is soldered to the upper face of a third dielectric wafer 44 mounted on wafer 34. A conductive strip 46 is disposed between wafers 34 and 44 and is electrically and mechanically joined to the adjacent faces of these two wafers. End lead 40 is isolated from or is capacitively coupled to wiring plate 36, depending upon the dielectric constant of wafer 32. End lead 42 of element 38 is capacitively coupled to conductive strip 46 through wafer 44. Conductive strip 46 may be electrically isolated from wiring plate 36 by forming wafer 34 of a material having a low dielectric constant. The dielectric constant of wafers 32, 34 and 44 may be chosen to give any desired capacitance between the upper face of the wafer and the wiring plate or between the upper face of wafer 44 and conductive strip 46. With the range of dielectric constants of wafers commercially available it is possible to make the capacity provided by each of these wafers fall anywhere within the range of 1 to 1500 micromicrofarads.

The embodiment of the invention shown in Fig. 2 is similar to that shown in Fig. 1. Tubular members 48, 50, 52 and 54 are again provided for electrically shielding and mechanically supporting the electron tubes forming a part of the circuit. A conductive wiring plate 56 is disposed in the plane containing the axes of tubular members 48, 50, 52 and 54. Circuit elements are mounted on wiring plate 56 by means of dielectric wafers as described above. While all of the circuit elements shown have an elongated cylindrical shape, mica capacitors or circuit elements having a similar flat shape may be mounted in a similar manner with one face adjacent wiring plate 56. A second plate 58 is provided to give additional mechanical support to the structure and to provide means for electromagnetically shielding interstage coupling coils 60 and 62. Plate 58 is formed with openings 64 and 66 to receive coils 60 and 62 in a non-contacting relationship. Coils 60 and 62 are so disposed that the windings of each of these coils extend for equal distances on either side of plate 58. Plate 58 thereby forms a conductive shorted turn about the center of each of coils 60 and 62. These shorted turns provide excellent electromagnetic shielding for coils 60 and 62. Plate 58 and the conductive shorted turns formed thereby are connected to the wiring plate 56 through tubular members 48, 50 and 52.

Figure 2A:
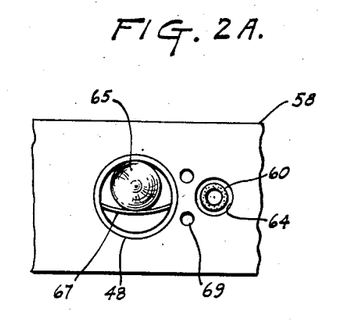
Fig. 2A is a fragmentary auxiliary view illustrating the manner in which electron tubes are supported within the structure of Fig. 2.

Fig. 2A illustrates the manner in which the electron tubes are supported within the structure of Fig. 2. Tube 65, which may be a miniature or subminiature type, has a diameter slightly greater than one-half the inner diameter of tubular support member 48. A thin spring plate 67 which may be formed of sheet metal or a plastic material is bent in the arcuate shape shown and inserted within tubular member 48. Spring plate 67 preferably has a length approximately equal to the longer dimension of tube 65 so that tube 65 is firmly supported against tubular member 48 throughout its length. The construction illustrated in Figs. 2 and 2A eliminates any need for a socket for tube 65.

Fig. 2A also shows in greater detail opening 64 in plate 58 and coil 60 disposed within this opening. A smaller opening 69 is also formed in plate 58 adjacent to tubular member 48 to receive a lead (not shown) from the end of coil 60 that is remote from wiring plate 56.

Amplifiers constructed in the manner shown in Figs. 1 and 2 have been found to be mechanically rugged, electrically stable and reproducible in manufacture. The mechanical stability of the amplifier is provided in part by mounting the circuit elements adjacent to the wiring plate where they receive a certain degree of mechanical support from the wiring plate. Also, the stand-off insulators employed in the construction of Figs. 1 and 2 are relatively thin dielectric wafers which are not subject to being bent out of shape by mechanical shocks. These dielectric wafers are disposed adjacent to the ends of the circuit elements so that the end leads are very short and therefore not subject to being deformed by mechanical shocks. The electron tubes are firmly supported within the tubular supporting members and the electrode leads from these tubes are short and are rigidly fastened to dielectric wafers adjacent the edge of the wiring plate.

The electrical stability of the construction shown in Figs. 1 and 2 is provided through the use of shorted turns for the interstage coupling coils which prevent linking of the magnetic fields of these coils with adjacent circuit elements. The wiring loop inductance of the circuit elements is also reduced by placing the circuit elements adjacent the wiring plate. It is well known that the inductance of a loop is proportional to the area of the loop. It can be seen that the area of the loop formed between a circuit element and the wiring plate is a minimum with the construction shown in Figs. 1 and 2. It is also known that the electrostatic coupling between two isolated objects in space may be greatly reduced by bringing these objects adjacent to a conductive plane. This form of electrostatic shielding has been provided in the embodiments of Figs. 1 and 2 by bringing the circuit elements to a position adjacent to the conductive wiring plate and by bringing any connecting points which may be at a high signal level to a position separated from the conductive wiring plates by the relatively small thickness of the dielectric wafers. The arrangements of all of the circuit elements on a common wiring plate permits the channeling of ground currents of the various stages to regions of the wiring plate not occupied by ground currents from adjacent stages. Therefore, coupling between adjacent stages by voltage drops in the wiring plate due to these ground currents is effectively eliminated.

The factors which contribute to the electrical and mechanical stability of the amplifier also contribute to the reproducibility of identical units under mass production conditions. The positions of the dielectric wafers on the conductive wiring plate may be accurately predetermined. The position of the dielectric wafers adjacent the ends of the circuit elements permits very little variation in the position of the circuit elements fastened thereto. Therefore, there is little possibility of having different electrical characteristics between successively manufactured amplifiers due to the fact that the physical locations of the circuit elements of one amplifier are different from the physical locations of circuit elements in the other amplifiers. Furthermore, the electromagnetic and electrostatic shielding provided by the construction of Figs. 1 and 2 makes small changes in position of these circuit elements relatively unimportant in determining the over-all characteristics of the amplifier.

Figure 3:
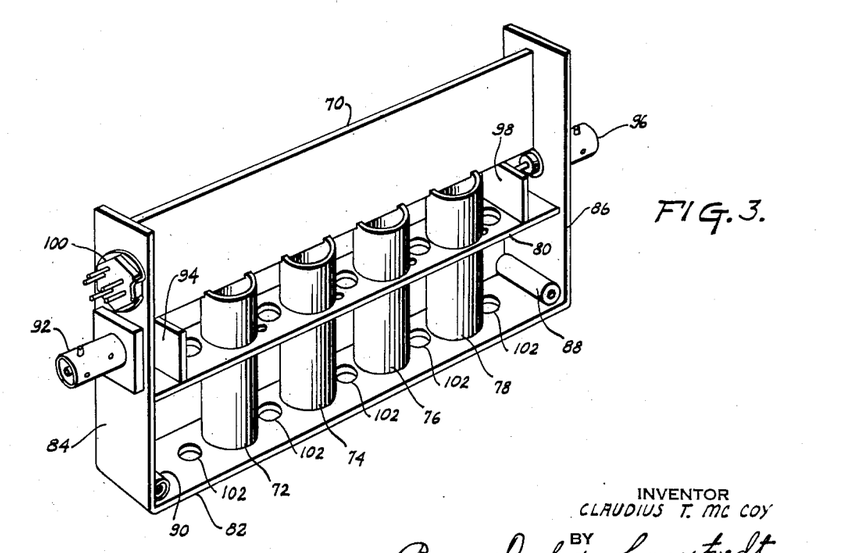
Fig. 3 is an isometric view of a preferred form of the present invention including a metallic wiring plate, means for electromagnetically shielding interstage coupling coils and a supporting frame.
Figure 6:
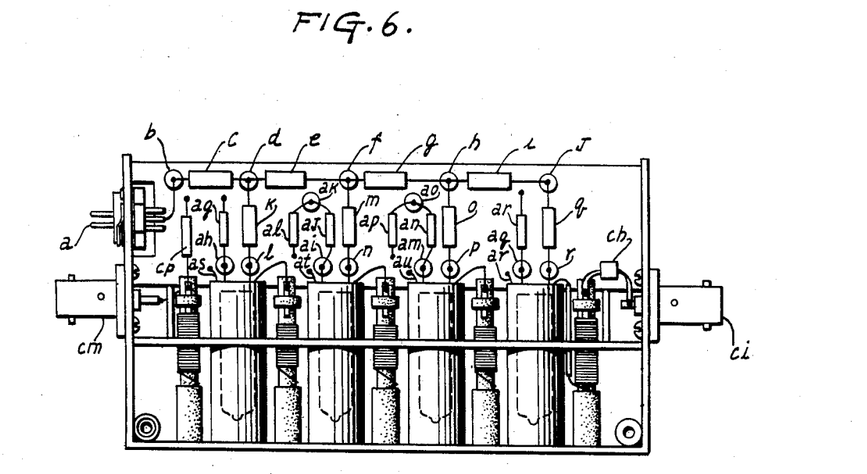
Fig. 6 is a view showing one side of an intermediate frequency amplifier constructed on a chassis similar to that shown in Fig. 3.
Figure 7:
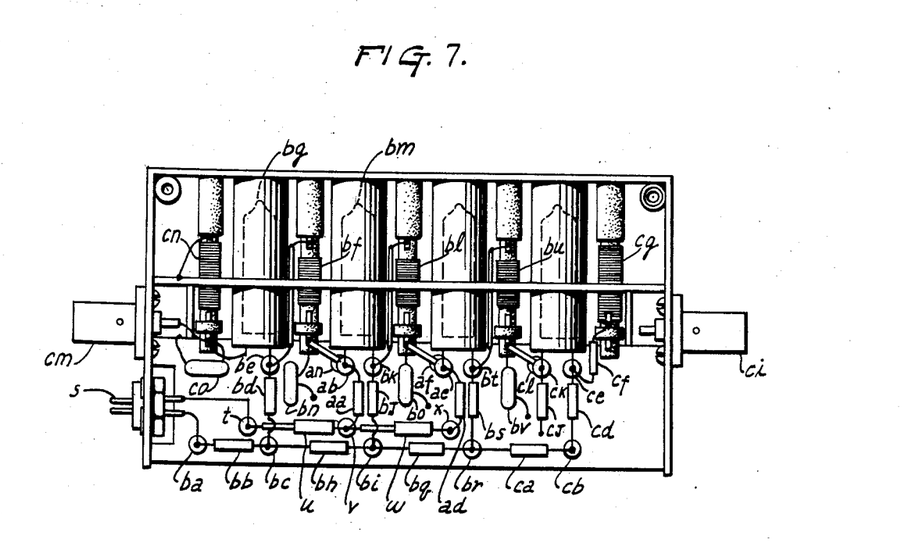
Fig. 7 is a second view of the amplifier of Fig. 6 showing the reverse side of this amplifier.

The chassis shown in Fig. 3 includes a metallic wiring plate 70 and four tubular shielding members 72, 74, 76 and 78. A conductive shielding plate 80 is also provided for shielding interstage coupling coils of a circuit constructed on the chassis. Wiring plate 70, shielding plate 80 and the tubular shield members 72, 74, 76 and 78 are electrically and mechanically joined to a supporting frame formed of a substantially straight base 82 and two upstanding arms 84 and 86. Shielding plate 80 is made narrower than arms 84 and 86 and the edges of plate 80 are spaced from the edges of arms 84 and 86 so that a shield or dust cover (not shown) may be placed over the chassis of Fig. 3 without contacting shielding plate 80. The upper edge of wiring plate 70 is displaced slightly from the upper ends of arms 84 and 86 for the same reason. With this type of construction, any currents induced in the shield or dust cover by external circuits will not be conducted to wiring plate 70 or shielding plate 80 and similarly, placing a shield over the chassis, shown in Fig. 3, will not provide alternative paths for currents within wiring plate 70 and shielding plate 80. Suitable tapped fastening members 88 and 90 are provided at the junction arms 84 and 86 with base 82 for securing a dust cover to the chassis. A coaxial signal input connector 92 is mounted on arm 84 in a position between wiring plate 70 and shielding plate 80. An auxiliary plate 94 is electrically joined to shielding plate 80 and wiring plate 70 to provide the shortest possible return path for currents in the outer conductor of coaxial connector 92 to the wiring plate 70. Auxiliary plate 94 may be omitted if desired, in which case the currents in the outer portion of the coaxial connector 92 will return to plate 70 through shielding plate 80 and tubular member 72. A coaxial output connector 96, similar to input connector 92, is provided on arm 86. An auxiliary plate 98 is connected between shielding plate 80 and wiring plate 70 to shorten the return path of currents in the outer portion of connector 96. A power plug 100 is mounted on arm 84 to provide means for supplying anode bias potential and filament current to the electron tubes disposed within tubular members 72, 74, 76 and 78. Wiring plate 70 is cut away as shown in Figs. 6 and 7 to receive power plug 100. Openings 102 are formed in base 82 to receive and mechanically support an end of the coil forms (not shown in Fig. 3) on which the interstage coupling coils are wound. The second end of the coil form may be supported by mechanically joining the end of the coil form to wiring plate 70.

Figure 3A:
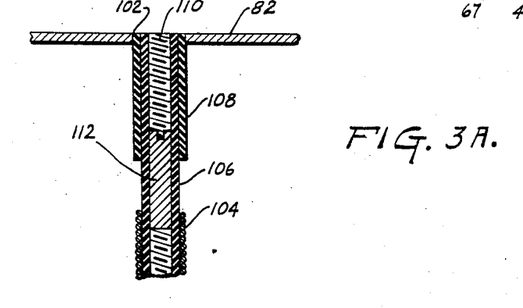
Fig. 3A is an auxiliary sectional view showing the manner in which the interstage coupling coils are supported in the chassis of Fig. 3.

Fig. 3A illustrates in detail the manner in which the ends of the coil forms are supported within openings 102. In this figure, base 82 is shown in section. An interstage coupling coil shown at 104 is wound on an insulating form 106. An insulating sleeve 108 is forced over form 106 to give additional rigidity to the end of this coil form. Sleeve 108 is received in a press fit within an opening 102 in base 82. Coil form 106 is hollow and is tapped as shown at 110 to receive a threaded brass slug 112. The resonant frequency of coil 104 may be adjusted by altering the position of slug 112 with respect to coil 104.

Figure 4:
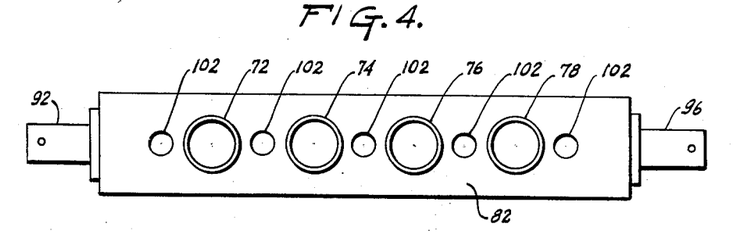
Fig. 4 is a view of the chassis of Fig. 3 showing the base of the U-shaped frame.
Figure 5:
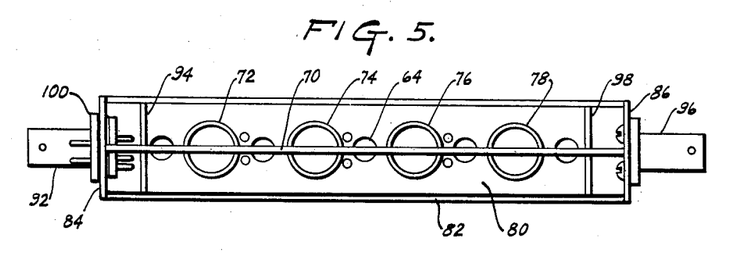
Fig. 5 is a view of the chassis of Fig. 3 taken from the end including the wiring plate.

Figs. 4 and 5 show top and bottom views of the chassis of Fig. 3. Parts in Figs. 4 and 5 are given reference numerals corresponding to like parts in Fig. 3.

Figure 8:
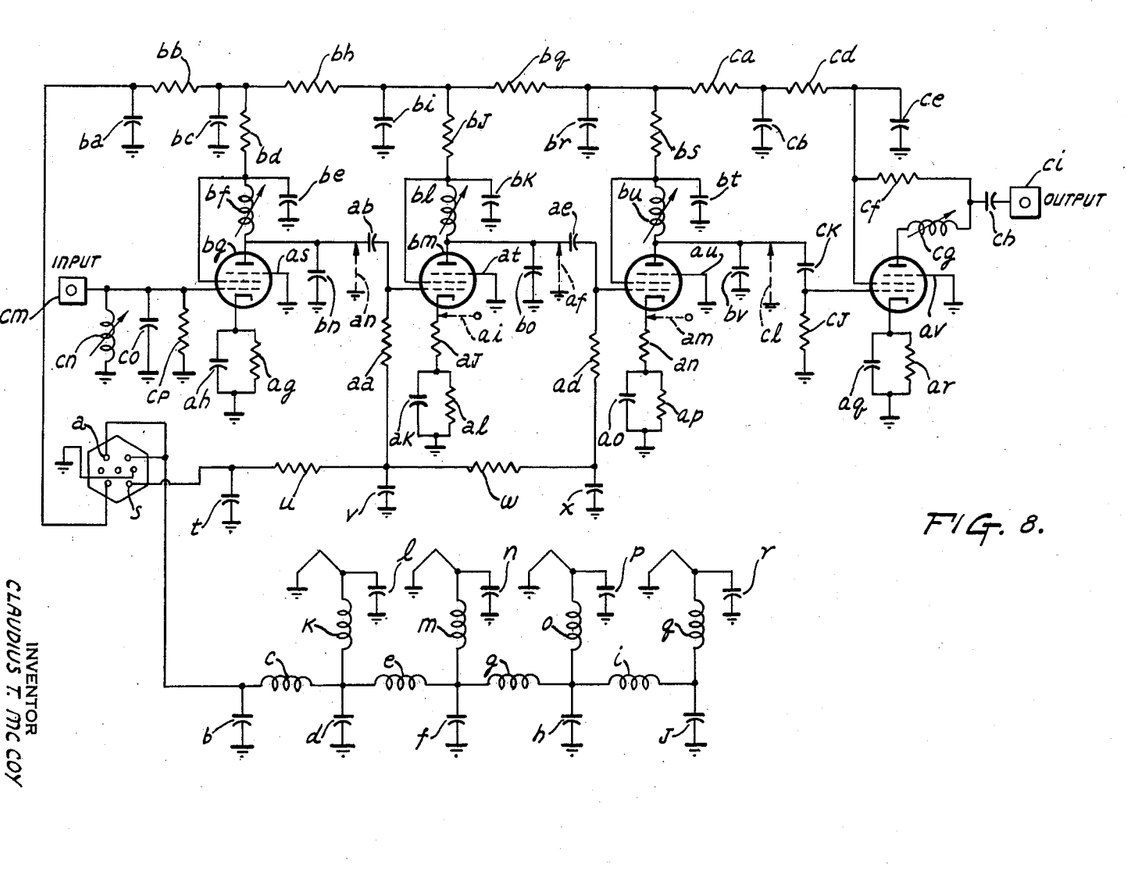
Fig. 8 is a schematic wiring diagram of the amplifier illustrated in Figs. 6 and 7.

Figs. 6 and 7 show the physical layout of the intermediate frequency amplifier circuit illustrated in Fig. 8 on a chassis of the type shown in Figs. 3, 4 and 5. Actual circuit elements in Figs. 6 and 7 and corresponding electrical symbols in Fig. 8 have the same reference numerals. The circuit of Fig. 8 is conventional and the operation of this type of amplifier is well known. Therefore, Figs. 6, 7 and 8 will not be described in detail. Circuits of the general type shown in Fig. 8 have been constructed to operate at frequencies of 10, 30, 60 and 90 mc. All of the resistors shown in Figs. 6 and 7 are one-half watt carbon resistors. The filtering inductors in the filament circuit are small, wire-wound inductors slightly shorter in length and slightly greater in diameter than a one-half watt resistor. The chassis shown in Figs. 4 and 5 is approximately 5¼" long, 3" high and 1" wide. The vacuum tubes are all subminiature type CK–5702. The coil forms on which the interstage coupling coils are wound are approximately 3/16" in diameter and the dielectric wafers are approximately ¼" in diameter and approximately .02" in thickness. Symbols $an$, $af$, and $cl$ in Fig. 8 represent stand off insulators in the form of wafers having a very low dielectric constant. Embodiments of the invention constructed in the manner shown in Figs. 6 and 7 will operate equally well with or without a shield or cover and the operation is not materially effected by contact between the wiring plate or the shielding plate and a metallic object.

The embodiments of the invention described above have been illustrated as having the tubes and interstage coupling coils arranged along a single edge of a rectangular wiring plate. However, the invention is not to be narrowly limited by this showing since the wiring plate may be rectangular, circular or irregular in shape and the electron tubes may be arranged along more than one edge thereof. Furthermore, an edge of the wiring plate may be deeply notched to receive the electron tubes and the interstage coupling coils. The electron tubes may be supported by strips bridging the notches and fastened to the wiring plate. Similarly, a shorted turn electromagnetic shield for the interstage coupling coils may be formed by two conductive strips or wires bridging a notch in a manner to form a loop.

The construction shown is also adaptable to circuits other than amplifier circuits. For example, pulse generating circuits, sweep circuits and discriminator circuits may be constructed on chassis similar to those shown in Figs. 1, 2 and 3.

Therefore, while I have described what are at present considered to be preferred embodiments of the present invention, it will be obvious that other and further modifications may be made therein without departing from the spirit and scope of the hereinafter appended claims.

I claim:

1. A compact, self-shielding chassis for an electronic circuit including a plurality of electron tubes, said chassis comprising a flat, rigid, continuous, metallic wiring plate, a plurality of conductive, sleevelike members disposed with the longitudinal axes thereof substantially in the plane of said plate, each of said members being electrically and mechanically joined at one end thereof to an edge of said plate, said edge dividing the joined end of said sleevelike member into two openings lying on opposite sides of said plate, said sleevelike members being of a size to receive and support said electron tubes therewithin.

2. A compact, self-shielding chassis for an electronic circuit including a plurality of electron tubes, said chassis comprising a flat, rigid, continuous, metallic wiring plate, a plurality of conductive, sleevelike members disposed with the lonigtudinal axes thereof in the plane of said plate, each of said members being electrically and mechanically joined at one end thereof to an edge of said plate, said edge dividing the joined end of said sleevelike member into two openings lying on opposite sides of said plate, said sleevelike members being of a size to receive said electron tubes therewithin, and a resilient member disposed within at least one of said sleevelike members for yieldably biasing an electron tube against said sleevelike member thereby to secure said tube in its operating position.

3. A compact, self-shielding, shock-resistant chassis for a relatively high frequency tuned amplifier or the like, said amplifier including a plurality of subminiature type electron tubes and a plurality of elongated current-carrying coils, said chassis comprising, a substantially flat, continuous, metallic wiring plate, a plurality of conductive, sleevelike members disposed with the longitudinal axes thereof substantially in the plane of said plate, each of said sleevelike members being electrically and mechanically joined at one end thereof to an edge of said plate, said edge dividing the joined end of said sleevelike member into two openings lying on opposite sides of said plate, said sleevelike members being of a size to receive said electron tubes therewithin, a resilient member disposed in at least one of said sleevelike members for yieldably urging an electron tube against the wall of said sleevelike member thereby to support said tube in its operating position, a rigid conductive member joining at least one pair of adjacent sleevelike members, said conductive member lying substantially in a plane perpendicular to said plate and to the axes of said sleevelike members, said conductive member being apertured to receive in a non-contacting relationship one of said elongated coil members disposed with the longer axis thereof substantially parallel to the axes of sleevelike members, and means for rigidly supporting said last-mentioned coil member in the aforesaid position, the mid-point of said coil lying within said aperture in said conductive member.

4. A compact, self-shielding, shock-resistant electronic circuit device comprising a flat, continuous, metallic wiring plate, a plurality of conductive, sleevelike members disposed with the longitudinal axes thereof substantially in the plane of said plate, each of said sleevelike members being electrically and mechanically joined at one end thereof to an edge of said plate, said edge dividing the joined end of said sleevelike member into two openings lying on opposite sides of said plate, a subminiature type tube disposed in each of said sleevelike members, the electrode leads of said tubes extending through said openings in proximity to said wiring plate, a plurality of elongated, current-carrying circuit elements, means for supporting said circuit elements in proximity to said wiring plate, means for interconnecting said circuit elements and said electrode leads of said electron tubes to form an operative electronic circuit, said interconnecting means being approximately straight and lying in proximity to said wiring plate.

5. The circuit device of claim 4, said device further comprising a resilient member disposed in each of said sleevelike members for yieldably urging the electron tube disposed therewithin against the wall of said sleevelike member, thereby to support said tube in its operating position.

6. A compact, self-shielding, shock-resistant electronic circuit device comprising a flat, continuous, metallic wiring plate, said plate having at least one straight edge, a plurality of conductive, sleevelike members disposed with the longitudinal axes thereof substantially in the plane of said plate, each of said sleevelike members being electrically and mechanically joined at one end thereof to said wiring plate at a point along said straight edge, said edge dividing the joined end of each of said sleevelike members into two openings lying on opposite sides of said plate, a subminiature type tube disposed in each of said sleevelike members, the electrode leads of said tubes extending through said openings in proximity to said wiring plate, a shielding plate disposed parallel to said first edge and perpendicular to the plane of said wiring plate, a supporting plate disposed parallel to said shielding plate and spaced therefrom on the side remote from said wiring plate, said shielding plate and said supporting plate being electrically and mechanically joined to said sleevelike members, at least one interstage coupling coil, said coil being disposed with the longer axis thereof substantially in the plane of said wiring plate, one end of said coil being mechanically secured to said wiring plate at a point intermediate the point of connection of two of said sleevelike members and the other end of said coil being mechanically secured to said supporting plate, said shielding member being apertured to receive said coil in a non-contacting relationship, a plurality of elongated current-carrying circuit elements, means for supporting said circuit elements in proximity to said wiring plate, means for interconnecting said circuit elements, said interstage coupling coil and said electrode leads of said electron tubes to form an operative electronic circuit, said interconnecting means lying in proximity to said wiring plate.

7. A multistage electronic circuit component comprising, a plurality of electron tubes, a plurality of circuit components, each having one linear dimension thereof which is appreciably less than a second dimension thereof, a flat, rigid, highly conductive wiring plate, means for supporting said tubes at spaced positions along an edge of said flat plate, means for supporting said circuit elements in juxtaposition with said plate, said circuit elements being disposed with said longer dimension parallel to said plate and said shorter dimension perpendicular to said plate, conductor means interconnecting said tubes and said circuit elements to form a plurality of stages, additional conductor means connecting said stages in operative relationship one with another, said conductor means and said additional conductor means being disposed in substantially a direct line between points connected thereby and adjacent and substantially parallel to said plate.

8. A multistage electronic circuit component comprising a plurality of electron tubes, a plurality of circuit components, each having one linear dimension thereof which is appreciably less than a second dimension thereof, a flat, highly conductive wiring plate, means mechanically secured to said plate for supporting said tubes at spaced positions along an edge of said flat plate, stiffening means spaced from said flat plate and mechanically associated with said tube supporting means, said stiffening means being positioned so as to increase the apparent rigidity of said flat plate, means for supporting said circuit elements in juxtaposition with said plate, said circuit elements being disposed with said longer dimension parallel to said plate and said shorter dimension perpendicular to said plate, conductor means interconnecting said tubes and said circuit elements to form a plurality of stages, additional conductor means connecting said stages in operative relationship one with another, said conductor means and said additional conductor means being disposed in substantially a direct line between points connected thereby and adjacent and substantially parallel to said flat plate.

9. A multistage electronic circuit component comprising a plurality of electron tubes, a plurality of elongated current carrying coils and a plurality of circuit components each having one dimension thereof which is appreciably less than a second dimension thereof, a flat, highly conductive wiring plate, a plurality of sleevelike members mechanically secured to said plate along one edge thereof for supporting said electron tubes at spaced positions along said edge, the longitudinal axes of said sleevelike members lying perpendicular to said edge and substantially in the plane of said flat plate, said plate dividing the joined end of each of said sleevelike members into two openings lying on opposite sides of said plate, a highly conductive stiffening member spaced from said flat plate and mechanically secured to said sleevelike members, said stiffening member being positioned so as to increase the apparent stiffness of said flat plate, said stiffening member being formed with openings therein to receive individually said elongated current carrying coils, means for supporting said coils with the midpoints thereof substantially coincident with the mid-point of the cross-section of said stiffening member, means for supporting said circuit element in juxtaposition with said plate, said circuit elements being disposed with said longer dimension parallel to said plate and said shorter dimension perpendicular to said plate, conductor means interconnecting said tubes, said coils and said circuit elements to form a plurality of stages, additional conductor means connecting said stages in operative relationship one with another, said conductor means and said additional conductor means being disposed in substantially a direct line between points connected thereby and adjacent and substantially parallel to said flat plate.

10. A multistage electronic circuit component comprising a plurality of electron tubes, a plurality of elongated current carrying coils and a plurality of circuit components each having one dimension thereof which is appreciably less than a second dimension thereof, a flat, highly conductive wiring plate, said wiring plate having at least one straight edge, a plurality of sleevelike members mechanically secured to said wiring plate along said straight edge thereof for supporting said electron tubes at spaced positions along said straight edge, the longitudinal axes of said sleevelike members lying perpendicular to said straight edge and substantially in the plane of said wiring plate, said plate dividing the joined end of each of said sleevelike members into two openings lying on opposite sides of said plate, a flat, highly conductive stiffening plate spaced from said first mentioned flat plate and mechanically secured to said sleevelike members, said stiffening plate being positioned in a plane substantially perpendicular to the plane of said wiring plate thereby to increase the apparent stiffness of said wiring plate, said stiffening plate being formed with openings therein to receive individually said elongated current carrying coils, means for supporting said coils with the mid-points thereof substantially coincident with the mid-point of the cross-section of said stiffening plate, means for supporting said circuit elements in juxtaposition with said wiring plate, said circuit elements being disposed with said longer dimension parallel to said wiring plate and said shorter dimension perpendicular to said wiring plate, conductor means interconnecting said tubes, said coils and said circuit elements to form a plurality of stages, additional conductor means connecting said stages in operative relationship one with another, said conductor means and said additional conductor means being disposed in substantially a direct line between points connected thereby and adjacent and substantially parallel to said flat wiring plate.

11. The electronic circuit component of claim 10 wherein said means for supporting said circuit elements on said wiring plate comprise a plurality of dielectric wafers having one face thereof mechanically secured to said wiring plate, a conductive coating adhered to the exposed face of said wafers, the conductive leads of said circuit elements being mechanically and electrically bonded to said conductive coating.

12. A high frequency electronic circuit construction as in claim 11 wherein said dielectric wafers have differing dielectric constants, the dielectric constant of each wafer being chosen to provide a preselected capacitance between the exposed face thereof and said chassis plate.

13. A chassis for an electronic circuit including a plurality of electron tubes and a plurality of elongated, current-carrying coils, said chassis comprising a flat, metallic wiring plate, means fastened to said wiring plate for supporting said electron tubes and said coils with the axes thereof in the plane of said plate, each of said electron tubes being supported with the base thereof adjacent to one edge of said plate, each of said coils being supported with one end thereof adjacent to one edge of said plate, and means electrically and mechanically joined to said wiring plate forming a conductive shorted turn about the central region of each of said coils.

14. A mechanically rigid, compact, self-shielding chassis for an electronic circuit including a plurality of electron tubes and a plurality of elongated, current-carrying coils, said chassis comprising a substantially flat, rectangular, metallic wiring plate, a plurality of conductive, sleevelike members disposed with the longitudinal axis thereof in the plane of said plate and substantially perpendicular to a first edge of said plate, each of said sleevelike members being electrically and mechanically joined at one end thereof to said first edge of said plate, said edge dividing the joined end of each of said sleevelike members into two openings lying on opposite sides of said plate, said sleevelike members being of a size to receive and support said electron tubes therewithin, and a second substantially rectangular plate lying in a plane substantially perpendicular to said wiring plate and to the axes of said sleevelike members, said second plate being formed with openings therein to receive said sleevelike members, said sleevelike members being rigidly fastened to said second plate, said second plate being further formed with centrally-disposed openings therein to receive said current-carrying coils in a non-contacting relationship.

15. A mechanically rigid, compact, self-shielding chassis for an electronic circuit including a plurality of electron tubes and a plurality of elongated, current-carrying coils, said chassis comprising a conductive strip formed in the shape of a U with a substantially straight base and two substantially straight arms of approximately equal length, a flat, conductive wiring plate joined to said arms adjacent the free ends thereof, said plate being oriented perpendicular to the planes of said arms and the plane of said base, and a second conductive plate disposed in a plane parallel to said base, said second plate being joined at the ends thereof to said arms, said second plate being spaced from said base and said wiring plate, said second plate being formed with openings therein to receive said tubes and said coils, said coils being received in a non-contacting relationship.

16. A mechanically rigid, compact, self-shielding chassis for an electronic circuit including a plurality of electron tubes and a plurality of elongated, current-carrying coils, said chassis comprising a substantially straight base and two substantially straight arms of approximately equal length extending at right angles to said base, a flat, conductive wiring plate joined to said arms adjacent the free ends thereof and substantially equidistant from the longer edges of said arms, said wiring plate lying in a plane perpendicular to said base and said arms, a plurality of conductive, sleevelike members disposed with their longitudinal axes in the plane of said wiring plate and perpendicular to the plane of said base, each of said sleevelike members being mechanically joined at one end to said base and mechanically and electrically joined at a second end to an edge of said wiring plate, said edge of said wiring plate dividing the second end of each of said sleevelike members into two openings lying on opposite sides of said plate, and a second conductive plate disposed in a plane parallel to said base and spaced from said base and said wiring plate, said second plate being formed with openings therein to receive said sleevelike members in a rigid electrical and mechanical contact, said second plate being formed with additional openings therein to receive said coils in a non-contacting relationship, said second plate thereby forming a conductive shorted turn about each of said current-carrying coils.

17. A compact, mechanically and electrically stable, self-shielding electronic circuit construction comprising a conductive strip formed in the shape of a U with a substantially straight base and two substantially straight arms of approximately equal length, a flat, conductive wiring plate joined to said arms adjacent the free ends thereof and substantially equidistant from the longer edges of said arms, a plurality of conductive, sleevelike members disposed with the longitudinal axes thereof in the plane of said wiring plate and perpendicular to the plane of said base, each of said sleevelike members being mechanically joined at one end to said base and at a second end to an edge of said wiring plate, a second conductive plate joined at its ends to said arms and disposed in a plane parallel to said base, said second plate being spaced from said base and said wiring plate, said second plate being formed with openings therein to receive said sleevelike members in a contacting relationship, an electron tube disposed in and supported by each of said sleevelike members, the base of each electron tube being disposed adjacent said edge of said wiring plate, a plurality of elongated current-carrying coils, each of said coils being mechanically supported at one end by said wiring plate and at a second end by said base, said second conductive plate being formed with a plurality of central openings therein to receive said coils in a non-contacting relationship, and a plurality of elongated current-carrying circuit elements of the group including resistors, capacitors and inductors mounted on said wiring plate, said circuit elements being disposed adjacent said wiring plate with the longer axes thereof parallel to said plate.

18. In an electronic circuit the construction comprising a metallic chassis plate, a current-carrying circuit element of the group including resistors, capacitors and inductors, said circuit element having a first dimension substantially greater than a second dimension, said circuit element being disposed adjacent said plate with said longer dimension substantially parallel to said plate, said circuit element being formed with a conductive lead extending from each end region thereof, first and second dielectric discs, each of said discs having one face thereof adhered to said chassis plate adjacent the two ends of said circuit element, said discs having a thickness less than the shorter dimension of said circuit element, each of said discs having a conductive coating adhered to the second and exposed face thereof, and means for securing said conductive leads to said conductive coating on said second face of said dielectric discs thereby to support said circuit element in the aforementioned position.

References Cited in the file of this patent

UNITED STATES PATENTS

| | | |
|---|---|---|
| 1,769,851 | Nachumsohn | July 1, 1930 |
| 2,219,396 | Plebanski | Oct. 29, 1940 |
| 2,245,379 | Barton | June 10, 1941 |
| 2,512,138 | Butt | June 20, 1950 |
| 2,555,039 | Bissonette | May 29, 1951 |
| 2,579,141 | Eckert et al. | Dec. 18, 1951 |

UNITED STATES PATENT OFFICE

CERTIFICATE OF CORRECTION

Patent No. 2,825,009  February 25, 1958

Claudius T. McCoy

It is hereby certified that error appears in the printed specification of the above numbered patent requiring correction and that the said Letters Patent should read as corrected below.

Column 1, line 69, for "technique" read -- techniques --; column 3, line 26, for "U-shaped" read -- U-shape --; column 8, line 73, column 9, line 15, lines 36 and 37, and line 70, for "components", each occurrence, read -- elements --; column 9, line 56, for "element" read -- elements --; column 10, line 59, for "axis" read -- axes --.

Signed and sealed this 29th day of September 1959.

(SEAL)
Attest:

KARL H. AXLINE
Attesting Officer

ROBERT C. WATSON
Commissioner of Patents